(12) United States Patent
Cooley et al.

(10) Patent No.: US 12,004,439 B2
(45) Date of Patent: Jun. 11, 2024

(54) BALE RETRIEVER THAT GENERATES DRIVEABLE PATH FOR EFFICIENCY AND TO REDUCE COMPACTION

(71) Applicant: CNH Industrial America LLC, New Holland, PA (US)

(72) Inventors: Devin Cooley, Shillington, PA (US); Scott C. Simmons, Lititz, PA (US); Kevin M. Smith, Narvon, PA (US)

(73) Assignee: CNH Industrial America LLC, New Holland, PA (US)

( * ) Notice: Subject to any disclaimer, the term of this patent is extended or adjusted under 35 U.S.C. 154(b) by 772 days.

(21) Appl. No.: 17/151,505

(22) Filed: Jan. 18, 2021

(65) Prior Publication Data
US 2022/0225557 A1     Jul. 21, 2022

(51) Int. Cl.
| | |
|---|---|
| *A01B 69/04* | (2006.01) |
| *A01B 79/00* | (2006.01) |
| *G01C 21/00* | (2006.01) |
| *G01C 21/30* | (2006.01) |
| *G05D 1/00* | (2006.01) |

(52) U.S. Cl.
CPC .......... *A01B 69/008* (2013.01); *A01B 79/005* (2013.01); *G01C 21/30* (2013.01); *G05D 1/0274* (2013.01); *G05D 1/0278* (2013.01)

(58) Field of Classification Search
None
See application file for complete search history.

(56) References Cited

U.S. PATENT DOCUMENTS

| | | | |
|---|---|---|---|
| 8,234,033 B2 * | 7/2012 | Brubaker | G05D 1/0278 |
| | | | 701/40 |
| 8,571,744 B2 | 10/2013 | Brubaker et al. | |
| 9,527,211 B2 | 12/2016 | Posselius et al. | |
| 2017/0118918 A1 * | 5/2017 | Chaney | A01F 15/0883 |
| 2018/0252531 A1 * | 9/2018 | Johnson | G01C 21/20 |
| 2019/0289769 A1 * | 9/2019 | Antich | G05D 1/0278 |

OTHER PUBLICATIONS

Extended European Search Report for EP Application No. 22151175.6 dated Nov. 3, 2022 (six pages).

* cited by examiner

*Primary Examiner* — Aniss Chad
*Assistant Examiner* — Mahmoud M Kazimi
(74) *Attorney, Agent, or Firm* — Peter K. Zacharias; Rebecca L. Henkel; Rickard K. DeMille

(57) ABSTRACT

A bale retriever includes: a chassis; a steering assembly carried by the chassis and configured to steer the bale retriever; a bale pick up carried by the chassis; and a controller operatively coupled to the steering assembly. The controller is configured to: receive a field signal corresponding to a field map; receive a baler travel signal corresponding to at least one of a baler planned path or a baler travel path of at least one baler; define an expected location of at least one bale on the field map based at least partially on the baler travel signal; generate a steering control signal based at least partially on the expected location of the at least one bale; and output the steering control signal to the steering assembly.

18 Claims, 8 Drawing Sheets

BALE RETRIEVER THAT GENERATES DRIVEABLE PATH FOR EFFICIENCY AND TO REDUCE COMPACTION

FIELD OF THE INVENTION

The present invention pertains to agricultural vehicles and, more specifically, to bale retrievers and systems for producing and transporting crop material bales.

BACKGROUND OF THE INVENTION

Agricultural machines, such as balers, are well-known for collecting cut crop material and packing the cut crop material into bales for easier transport. A typical baler has a crop collector, which also may be referred to as a "pickup", that utilizes tines or other elements to direct the cut crop material to a bale chamber that packs the crop material into a bale. After the crop material is packed into a bale with the desired size, the bale is ejected out the back of the baler.

Once the bale is formed, it needs to be transported from the field to a different location, such as a staging area, where the bale is stored. A bale retriever that includes a bale fork or similar pick up mechanism may be used to pick up multiple bales and move the bales to the staging area. While known bale retrievers are effective to pick up and transport bales, fuel use by the bale retriever remains an area where improvements can realize large economic gains. Further, known bale retrievers are not well-suited for use in picking up and transporting bales while one or more balers are actively producing bales in a field.

What is needed in the art is a bale retriever that can address some of the previously described issues of known bale retrievers.

SUMMARY OF THE INVENTION

Exemplary embodiments disclosed herein provide a bale retriever with a controller that defines an expected location of a bale based on a baler travel path and/or a baler planned path to generate a steering control signal for controlling a steering assembly of the bale retriever.

Exemplary embodiments disclosed herein also provide a bale retriever with a controller that generates a steering control signal that differs based on whether the controller is in an efficiency mode or a compaction mode and outputs the steering control signal to a steering assembly.

In some exemplary embodiments provided according to the present disclosure, a bale retriever includes: a chassis; a steering assembly carried by the chassis and configured to steer the bale retriever; a bale pick up carried by the chassis; and a controller operatively coupled to the steering assembly. The controller is configured to: receive a field signal corresponding to a field map; receive a baler travel signal corresponding to at least one of a baler planned path or a baler travel path of at least one baler; define an expected location of at least one bale on the field map based at least partially on the baler travel signal; generate a steering control signal based at least partially on the expected location of the at least one bale; and output the steering control signal to the steering assembly.

In some exemplary embodiments provided according to the present disclosure, a system for producing and transporting crop material bales includes: at least one baler including a crop collector configured to collect crop material from a field and a bale chamber configured to bale crop material collected by the crop collector; and at least one bale retriever including: a chassis; a steering assembly carried by the chassis and configured to steer the bale retriever; a bale pick up carried by the chassis; and a controller operatively coupled to the steering assembly. The controller is configured to: receive a field signal corresponding to a field map; receive a baler travel signal corresponding to at least one of a baler planned path or a baler travel path of at least one baler; define an expected location of at least one bale on the field map based at least partially on the baler travel signal; generate a steering control signal based at least partially on the expected location of the at least one bale; and output the steering control signal to the steering assembly.

In some embodiments, a method of controlling a bale retriever comprising a controller to retrieve bales in a field is provided. The method is performed by the controller and includes: receiving a field signal corresponding to a field map; receiving a baler travel signal corresponding to at least one of a baler planned path or a baler travel path of at least one baler; defining an expected location of at least one bale on the field map based at least partially on the baler travel signal; generating a steering control signal based at least partially on the expected location of the at least one bale; and outputting the steering control signal to a steering assembly of the bale retriever so the bale retriever is steered towards the expected location of the at least one bale.

In some exemplary embodiments provided according to the present disclosure, a bale retriever includes: a chassis; a steering assembly carried by the chassis and configured to steer the bale retriever; a bale pick up carried by the chassis; and a controller operatively coupled to the steering assembly. The controller is configured to: receive a field signal corresponding to a field map; define at least one windrow on the field map; receive a baler travel signal corresponding to a baler travel path of at least one baler; define a baler traveled path on the field map from the received baler travel signal; define an expected location of at least one bale on the field map; switch between an efficiency mode and a compaction mode; generate a steering control signal that is at least one of a shortest distance control signal or a compaction avoidance control signal; and output the steering control signal to the steering assembly. The controller is configured to generate the shortest distance control signal when in the efficiency mode and the compaction avoidance control signal when in the compaction mode, the shortest distance control signal corresponding to a straight-line path from the bale retriever to the expected location of the at least one bale that does not cross the at least one windrow and the compaction avoidance control signal corresponding to a path from the bale retriever to the expected location of the at least one bale that overlaps the baler traveled path.

In some exemplary embodiments provided according to the present disclosure, a system for producing and transporting crop material bales includes: at least one baler including a crop collector configured to collect crop material from a field and a bale chamber configured to bale crop material collected by the crop collector; and at least one bale retriever including: a chassis; a steering assembly carried by the chassis and configured to steer the bale retriever; a bale pick up carried by the chassis; and a controller operatively coupled to the steering assembly. The controller is configured to: receive a field signal corresponding to a field map; define at least one windrow on the field map; receive a baler travel signal corresponding to a baler travel path of the at least one baler; define a baler traveled path on the field map from the received baler travel signal; define an expected location of at least one bale on the field map; switch between an efficiency mode and a compaction mode; generate a steering control signal that is at least one of a shortest distance control signal or a compaction avoidance control signal; and output the steering control signal to the steering assembly. The controller is configured to generate the shortest distance control signal when in the efficiency mode and the compaction avoidance control signal when in the compaction mode, the shortest distance control signal corresponding to a straight-line path from the bale retriever to the expected location of the at least one bale that does not cross the at least one windrow and the compaction avoidance control signal corresponding to a path from the bale retriever to the expected location of the at least one bale that overlaps the baler traveled path.

In some embodiments, a method of controlling a bale retriever including a controller to retrieve bales in a field is provided. The method is performed by the controller and includes: receiving a field signal corresponding to a field map; defining at least one windrow on the field map; receiving a baler travel signal corresponding to a baler travel path of at least one baler; defining a baler traveled path on the field map from the received baler travel signal; defining an expected location of at least one bale on the field map; switching between an efficiency mode and a compaction mode; generating a steering control signal that is at least one of a shortest distance control signal or a compaction avoidance control signal; and outputting the steering control signal to a steering assembly of the bale retriever so the bale retriever is steered toward the expected location of the at least one bale. The controller is configured to generate the shortest distance control signal when in the efficiency mode and the compaction avoidance control signal when in the compaction mode, the shortest distance control signal corresponding to a straight-line path from the bale retriever to the expected location of the at least one bale that does not cross the at least one windrow and the compaction avoidance control signal corresponding to a path from the bale retriever to the expected location of the at least one bale that overlaps the baler traveled path.

One possible advantage that may be realized by exemplary embodiments disclosed herein is that the controller can define the expected location of a bale based on a prediction of where a baler will drop the bale, so the bale retriever can operate simultaneously with the baler in a field.

Another possible advantage that may be realized by exemplary embodiments disclosed herein is that multiple bale retrievers and balers can operate simultaneously in a field to expedite production and transportation of bales.

Another possible advantage that may be realized by exemplary embodiments disclosed herein is that the controller generating two possibly different control signals allows a user to control whether the bale retriever operates to maximize fuel efficiency and/or minimize ground compaction.

Another possible advantage that may be realized by exemplary embodiments disclosed herein is that real-time communication between the bale retriever and the baler can reduce the amount of time that a bale stays in the field outside the staging area with a low risk of the bale retriever driving into the baler, or vice versa.

Yet another possible advantage that may be realized by exemplary embodiments disclosed herein is that the controller of the bale retriever can be configured to define the expected bale location based on the baler travel path and one or more operating parameters of the baler, allowing the bale retriever to move toward the expected location before the baler has finished forming the bale.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings.

DETAILED DESCRIPTION OF THE INVENTION

Figure 1:
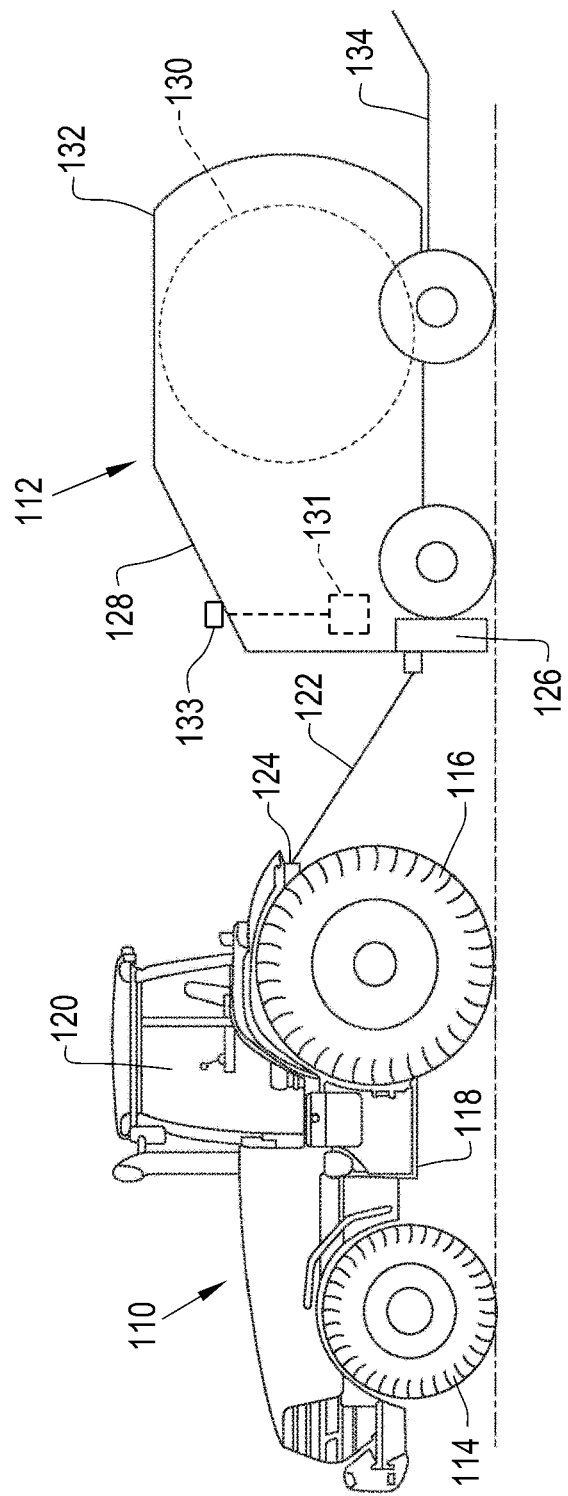
FIG. 1 illustrates a side view of an exemplary embodiment of a tractor and a baler that may be part of a system for producing and transporting crop material bales, provided in accordance with the present disclosure.

Referring now to the drawings, FIG. 1 illustrates a side view of an exemplary embodiment of a work vehicle 110 towing a baler 112 in accordance with the present disclosure to perform a baling operation within a field. As will be described further herein, the baler 112 may be part of a system 200 for producing and transporting crop material bales that includes the baler 112 and a bale retriever 202 (illustrated in FIG. 2). As shown, the work vehicle 110 is configured as an agricultural tractor, such as an operator-driven tractor or an autonomous tractor. However, in some embodiments, the work vehicle 110 may correspond to any other suitable vehicle configured to tow a baler across a field or that is otherwise configured to facilitate the performance of a baling operation, including an autonomous baling vehicle. Additionally, as shown, the baler 112 is configured as a round baler configured to generate round bales. However, in some embodiments, the baler 112 may have any other suitable configuration, including being configured to generate square or rectangular bales. It should be further appreciated that the baler 112, while shown as being towed by a tractor 110, may also be a self-propelled baler that does not rely on a separate vehicle for propulsion and/or power to function.

As shown in FIG. 1, the work vehicle 110 includes a pair of front wheels 114, a pair of rear wheels 116, and a chassis 118 coupled to and supported by the wheels 114, 116. An operator's cab 120 may be supported by a portion of the chassis 118 and may house various input devices for permitting an operator to control the operation of the work vehicle 110 and/or the baler 112. Additionally, the work vehicle 110 may include an engine and a transmission mounted on the chassis 118. The transmission may be operably coupled to the engine and may provide variably adjusted gear ratios for transferring engine power to the wheels 116 via a drive axle assembly.

As shown in FIG. 1, the work vehicle 110 may be coupled to the baler 112 via a tongue 122 mounted on a hitch 124 of the work vehicle 110 to allow the vehicle 110 to tow the baler 112 across the field. As such, the work vehicle 110 may, for example, guide the baler 112 toward crop material deposited in windrows on the field. As is generally understood, to collect the crop material, the baler 112 includes a crop collector 126 (shown schematically in FIG. 1) mounted on the front end of the baler 112. The crop collector 126 may, for example, have a rotating wheel with tines that collects crop material from the ground and directs the crop material toward a bale chamber 128 of the baler 112. Inside the bale chamber 128, rollers, belts, and/or other devices compact the crop material to form a generally cylindrically shaped bale 130. The bale 130 is contained within the baler 112 until ejection of the bale 130 is instructed (e.g., by the operator and/or a baler controller 131). In some embodiments, the bale 130 may be automatically ejected from the baler 112 once the bale 130 is formed by the baler controller 131 detecting that the bale 130 is fully formed and outputting an appropriate ejection signal.

As shown in FIG. 1, the baler 112 may also include a tailgate 132 movable between a closed position (as shown in the illustrated embodiment) and an opened position via a suitable actuator assembly. The tailgate 132 and/or actuator assembly may be controlled to open and close by the baler controller 131. In the closed position, the tailgate 132 may confine or retain the bale 130 within the baler 112. In the open position, the tailgate 132 may rotate out of the way to allow the bale 130 to be ejected from the bale chamber 128. Additionally, as shown in FIG. 1, the baler 112 may include a ramp 134 extending from its aft end that is configured to receive and direct the bale 130 away from the baler 112 as it is being ejected from the bale chamber 128. In some embodiments, the ramp 134 may be spring loaded, such that the ramp 134 is urged into a raised position, as illustrated. In such embodiments, the weight of the bale 130 on the ramp 134 may drive the ramp 134 to a lowered position in which the ramp 134 directs the bale 130 to the soil surface. Once the bale 130 is ejected, the bale 130 may roll down the ramp 134 and be deposited onto the field. As such, the ramp 134 may enable the bale 130 to maintain its shape and desired density by gently guiding the bale 130 onto the field.

It should be appreciated that the configuration of the work vehicle 110 described above and shown in FIG. 1 is provided only as one example. Thus, it should be appreciated that the present disclosure may be readily adaptable to any manner of work vehicle configuration. For example, in an alternative embodiment, a separate frame or chassis may be provided to which the engine, transmission, and drive axle assembly are coupled, a configuration common in smaller tractors. Still other configurations may use an articulated chassis to steer the work vehicle 110, or rely on tracks in lieu of the wheels 114, 116. Additionally, as indicated previously, the work vehicle 110 may, in some embodiments, be configured as an autonomous vehicle. In such embodiments, the work vehicle 110 may include suitable components for providing autonomous vehicle operation and, depending on the vehicle configuration, need not include the operator's cab 120.

Additionally, it should be appreciated that the configuration of the baler 112 described above and shown in FIG. 1 is provided only as one example. Thus, it should be appreciated that the present disclosure may be readily adaptable to any manner of baler configuration. For example, as indicated previously, the baler 112 may, in some embodiments, correspond to a square baler configured to generate square or rectangular bales.

Figure 2:
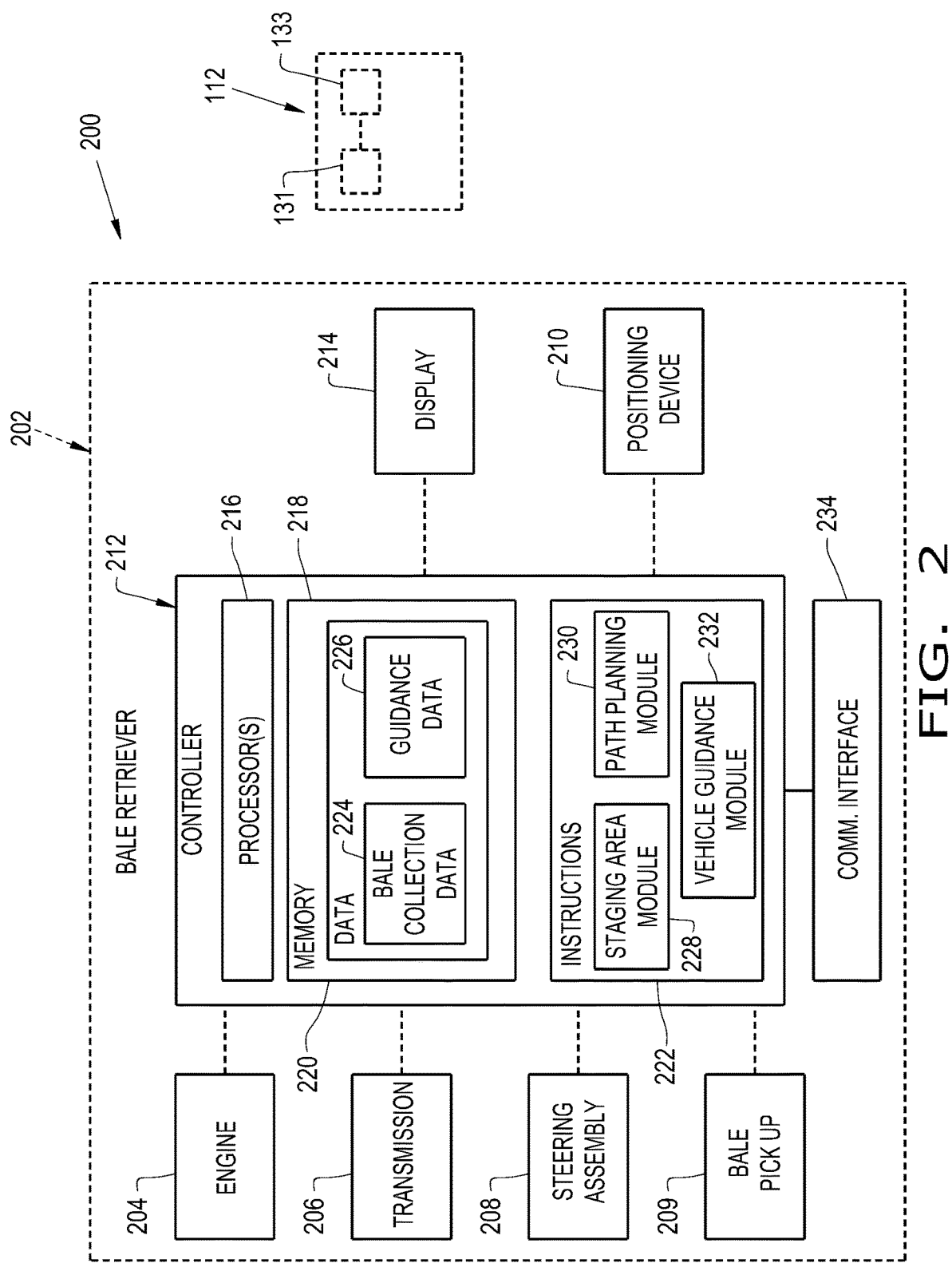
FIG. 2 illustrates a schematic diagram of an exemplary embodiment of a bale retriever that may be used as part of the system for producing and transporting crop material bales, provided in accordance with the present disclosure.

Referring now to FIG. 2, a schematic view of an exemplary embodiment of a system 200 for producing and collecting crop material bales is illustrated in accordance with the present disclosure. In general, the system 200 will be described herein with reference to the work vehicle 110 and the baler 112 described previously with reference to FIG. 1. However, it should be appreciated that the system 200 may generally be utilized with work vehicles having any suitable vehicle configuration and/or balers having any suitable baler configuration. Additionally, for purposes of providing an example of a bale production and collection operation, the system 200 will generally be described herein with reference to performance of the bale production and collection operation following the example baling operation described herein. However, it should be appreciated that the system 200 may generally be utilized to perform a bale collection and transportation operation following the performance of any suitable baling operation within any suitable field.

The system 200 includes at least one baler 112 and at least one bale retriever 202 configured to collect bales previously deposited within a field. In some embodiments, the bale retriever 202 may be towed by the tractor 110 described previously with reference to FIG. 1. For example, upon completion of the baling operation, the baler 112 may be unhitched from the tractor 110 and a suitable bale pick up or other implement (e.g., a bale spear) may be installed on the tractor 110 to allow for the collection of bales from the field. In some embodiments, the bale retriever 202 may correspond to another suitable vehicle that can be used to collect bales standing within the field, including any suitable autonomous vehicle and/or any suitable operator-driven vehicle (e.g., a skid-steer loader). It should be appreciated that, in some embodiments, the baler(s) 112 and the bale retriever(s) 202 are separate vehicles in the system 200 that can operate simultaneously within a field to produce and collect crop material bales.

As shown in FIG. 2, the bale retriever 202 may include various components for allowing the bale retriever 202 to be moved across the field during the bale collection operation. For example, the bale retriever 202 may include an engine 204 and a transmission 206 coupled to the engine 204 for propelling the vehicle 202 through the field. In addition, the bale retriever 202 may include a steering assembly 208 for steering the bale retriever 202. In some embodiments, the steering assembly 208 may be configured to be manually operated via the operator to steer the vehicle 202. The steering assembly 208 may also be configured to be automatically and/or autonomously controlled to allow the bale retriever 202 to be directed along a predetermined path(s) across the field, either additionally or alternatively to manual control of the steering assembly 208. For example, in some embodiments, the steering assembly 208 may include or form part of an auto-guidance system for automatically steering the bale retriever 202. In such an embodiment, the bale retriever 202 may correspond to a fully autonomous vehicle, a semi-autonomous vehicle, or an otherwise manually operated vehicle having one or more autonomous functions (e.g., automated steering or auto-guidance functions). The bale retriever 202 also includes a bale pick up 209, which may be a fork or other component that is configured to pick up crop material bales from a field and, for example, place the picked up bale on a holding platform (which may include a conveyor) of the bale retriever 202.

Additionally, the bale retriever 202 may also include a positioning device 210 configured to monitor or track the position of the vehicle 202 as it is traversed across a field. For example, in some embodiments, the positioning device 210 may be configured to determine the exact location of the bale retriever 202 using a satellite navigation position system (e.g. a GPS system, a Galileo positioning system, the Global Navigation satellite system (GLONASS), the BeiDou Satellite Navigation and Positioning system, and/or the like).

As shown in FIG. 2, the bale retriever 202 may also include a controller 212. The controller 212 is operatively coupled to the steering assembly 208 and, in some embodiments, one or more other components of the bale retriever 202 (e.g., the engine 204 and/or the transmission 206) for electronically controlling the operation of such component(s) (e.g. electronic control based on inputs received from the operator and/or automatic electronic control for executing one or more autonomous control functions). As will be described in greater detail herein, the controller 212 is configured to generate one or more paths for the bale collection operation while being capable of taking into account any negative impacts to the field (e.g., compaction and/or yield losses). For example, the controller 212 may be configured to generate guidance lines for collecting the various bales deposited within the field and for transporting such bales to a selected location defined relative to the field (e.g., a staging area). The controller 212 may then utilize the guidance lines for guiding the bale retriever 202 across the field as each bale is collected and subsequently delivered to the selected staging area. For example, in some embodiments, the controller 212 may be configured to automatically control the operation of the bale retriever 202 via control of the steering assembly 208 such that the bale retriever 202 is moved across the field along the determined guidance lines without any operator input (e.g., for autonomous vehicle operation and/or when otherwise operating in an autonomous mode). Alternatively, the controller 212 may be configured to display the determined guidance lines on an associated display device 214 of the bale retriever 202 to allow the operator to navigate the vehicle 202 across the field based on the displayed guidance lines.

In general, the controller 212 may correspond to any suitable processor-based device(s), such as a computing device or any combination of computing devices. Thus, as shown in FIG. 2, the controller 212 may generally include one or more processor(s) 216 and associated memory devices 218 configured to perform a variety of computer-implemented functions (e.g., performing the methods, steps, algorithms, calculations and the like disclosed herein). As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory 218 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory 218 may generally be configured to store information accessible to the processor(s) 216, including data 220 that can be retrieved, manipulated, created and/or stored by the processor(s) 216 and instructions 222 that can be executed by the processor(s) 216.

In some embodiments, the data 220 may be stored in one or more databases. For example, the memory 218 may include a bale collection database 224 for storing data associated with the bales to be collected from the field during the performance of the bale collection operation. Such data may, for instance, include any data collected during the performance of the prior baling operation, such as the position data associated with the location of the baling paths relative to the field, the heading data associated with the heading of the vehicle/baler along each baling path, and/or the position data associated with the specific location of each bale within the field. In addition, various other types of data may be stored within the bale collection database 224. For example, in some embodiments, data may be stored within the bale collection database 224 that is associated with one or more operator inputs, one or more user-defined system preferences, and/or other system inputs relevant to one or more aspects of the present disclosure, such as data associated with the specific type of bales being collected (e.g., round bales vs. square/rectangular bales), data associated with the specific size of bales being collected (e.g., 4×5, 5×5, or 6×5), data associated with a desired or selected location for the staging area at which the bales will be aggregated, data associated with a desired spacing or arrangement of the collected bales within the staging area, and/or any other relevant data.

Additionally, as shown in FIG. 2, the memory 218 may also include a guidance database 226 for storing data associated with guiding the bale retriever 202 during the performance of the bale collection operation. For example, as indicated previously, the controller 212 may be configured to generate guidance lines along which the bale retriever 202 is to be traversed when collecting the bales and subsequently aggregating the bales at the desired staging area. As such, the guidance database 226 may, for example, include data associated with the computer-generated guidance lines, such as GPS data or map data that maps each guidance line across the field.

Referring still to FIG. 2, in some embodiments, the instructions 222 stored within the memory 218 of the controller 212 may be executed by the processor(s) 216 to implement a staging area module 228. In general, the staging area module 228 may be configured to determine a location(s) relative to the field that will serve as a "staging area" for aggregating the various bales being collected from the field. Specifically, in some embodiments, the staging area module 228 may be configured to automatically select the location for the staging area based on one or more factors, including, but not limited to, the locations of the various bales within the field, the size and/or shape of the field, and/or any user-defined or predetermined system preferences associated with the desired location of the staging area relative to the field. The instructions 222 stored within the memory 218 of the controller 212 may also be executed by the processor(s) 216 to implement a path planning module 230, which may be configured to plan a travel path of the bale retriever 202, and a vehicle guidance module 232, which may be configured to guide the bale retriever 202.

In known bale retrievers, the bale retriever generally follows a pre-determined path and follows the baler in a field. While this is effective, there are a few shortcomings with such a strategy. For example, the bale retriever is not controlled based on the real-time data and thus is not being controlled to follow optimized paths for the current status of the field. Similarly, the bale retriever is not generally able to operate simultaneously with the baler. Further, following a single baler in the field limits the ability of the bale retriever to collect bales from multiple balers.

To address some of the previously described issues with known bale retrievers and systems that incorporate such bale retrievers, and referring now to FIGS. 3-6, the system 200 is illustrated in graphical form on a field map 300. The controller 212 of the bale retriever 202 is configured to receive a field signal corresponding to the field map 300, which may be stored in the memory 220 of the controller 212. In some embodiments, the field map 300 is constructed and updated solely within the controller 212; in other embodiments, the field map 300 is presented as a graphic on the display device 214 in a manner that is similar to the graphical illustration of the field map 300 of FIGS. 3-6. It should thus be appreciated that the field map 300 may be constructed solely for use by the controller 212 or, alternatively, may also be presented graphically on a display device 214 or elsewhere so an operator may see the state of the field via the field map 300. Field signals corresponding to the field map 300 may be received from a variety of sources.

In some embodiments, the field signal comes from the baler 112 as it operates and is continuously output to a communication interface 234 of the bale retriever 202, which is operatively coupled to the controller 212, so the controller 212 is configured to receive real-time signals corresponding to various aspects of the baler 112 and the field, as will be described further herein. For example, the communication interface 234 of the bale retriever 202 may interface with a corresponding communication interface 133 of the baler 112 (illustrated in FIG. 1) using radio signals or other types of communication signals to receive the field signal. Alternatively, field signals corresponding to the field map 300 may be received from a communication network 310 that is established with the system 200 using one or more communication protocols and a network hub 311 that interfaces with the respective communication interfaces 133, 234 but is not carried by either the baler 112 or the bale retriever 202. The network hub 311 may be, for example, a device commonly known as a "router" or similar device. It should be appreciated that the controller 212 of the bale retriever 202 may receive field signals from other sources, such as a vehicle other than the baler 112, e.g., a mower-conditioner and/or an unmanned aerial vehicle. Further, while the field signal is described previously as being transmitted to the controller 212 wirelessly, in some embodiments the field signal corresponding to the field map 300 is received by the controller 212 from a physical connection, i.e., a wired connection, and/or a physical data source, e.g., a memory module. It should thus be appreciated that the field signal corresponding to the field map 300 may be received by the controller 212 in a variety of ways.

The controller 212 is configured to receive a baler travel signal corresponding to a baler planned path and/or a baler travel path of at least one baler, such as the baler 112. The baler planned path may be a path that the baler 112 is expected to follow in the field map 300, such as swath lines, and the baler travel path may be a path the baler 112 has traveled in the field map 300. The baler travel signal corresponding to the baler planned path and/or the baler travel path may be communicated to the bale retriever 202 directly from the baler 112 via the respective communication interfaces 234, 133, or, alternatively, communicated to the bale retriever 202 via the communication network 310. In some embodiments, the controller 212 is configured to receive real-time signals corresponding to the baler planned path and/or the baler travel path via the communication interface 234 so the controller 212 may control various aspects of the bale retriever 202 based on current, rather than historical, information. For example, the baler controller 131 may be configured to output a baler location signal that corresponds to a set of GPS coordinates that the baler 112 has traveled across during a given time interval, such as 5 seconds, and a current heading of the baler 112, which corresponds to a direction that the baler 112 is facing and thus the direction in which the baler 112 is expected to move forward. In some embodiments, the baler controller 131 is configured to output the baler travel signal whenever the current heading of the baler 112 changes, which indicates that the baler planned path and the baler travel path are changing.

The controller 212 is also configured to define an expected location of at least one bale 302 on the field map 300 based at least partially on the baler travel signal. In some embodiments, the controller 212 receives a previous bale drop location signal corresponding to a location of a previously dropped bale from the baler 112 and/or the communication network 310 and defines the expected location of the bale(s) 302 based at least partially on the received previous bale drop location signal. The baler controller 131 may, for example, record the current GPS coordinates of the baler 112 each time the baler 112 ejects a bale 302 and output such GPS coordinates as the previous bale drop location signal via the communication interface 133. Based on the location of a previously dropped bale, the controller 212 may be configured to define the expected location of a bale that has not yet been dropped by predicting the location where the baler 112 will next drop a bale. In this respect, the controller 212 may be configured to define the expected location of the bale also based at least partially on one or more operating parameters of the baler 112, including but not limited to the travel speed of the baler 112, the current heading of the baler 112, and/or a defined bale size (volume and/or mass) of each bale that is formed by the baler 112. It should be appreciated that the controller 212 may also be configured to define the expected location of the bale based simply on the baler travel signal by predicting at what locations the baler 112 is expected to drop bales and/or based on the previous bale drop location signal that corresponds to one or more locations in the field map 300 where the baler 112 has dropped a bale.

In some embodiments, the controller 212 is configured to define the expected location of a bale 302 based at least partially on the baler planned path and/or the baler travel path and one or more operating parameters of the baler 112, such as a travel speed of the baler 112, a current heading of the baler 112, and/or a defined size of the bales 302 produced by the bale chamber 128. The controller 212 may, for example, define the expected location of a bale 302 by calculating a volume of crop material collected (or expected to be collected) by the baler 112 as the baler 112 travels along the baler travel path (or is expected to travel along the baler planned path), collects crop material, and packs the crop material into forming bales; based on this calculation, the controller 212 may define the expected location of a bale 302 to be a location where the baler 112 is expected to have collected a defined volume of crop material to form the bale 302 and ejected the bale 302 onto the field. Alternatively, or in addition, the controller 212 may receive one or more signals from the baler 112 to determine when the mass of crop material in the bale chamber 128 is equal to a defined mass of crop material to form a bale 302, with the controller 212 then defining the expected location of the formed bale leaving the bale chamber 128 to be around the location of the baler 112 where the mass of crop material in the bale chamber 128 is equal to the defined mass. The controller 212 may take other parameters into account to define the expected location of a bale 302, such as a volume of crop material per unit length of windrows in the field, that are provided by components other than the baler 112, such as a mower-conditioner vehicle. Additional other parameters that the controller 212 may take into account to define the expected location of a bale 302 include, but are not limited to: a defined (or target) bale diameter; a defined (target) bale mass; a current diameter of a forming bale; a current weight of a forming bale; a swath volume from a previous raking and/or mowing operation; a historical distance traveled by the baler 112 to make bales in neighboring windrows; a slope of areas in the field map 300; and/or a planned driving path of the baler 112, which can take into account, e.g., headlands and/or the next swath taken. Thus, it should be appreciated that the controller 212 can be configured to define the expected location of a bale 302 based on a variety of parameters.

Figure 3:
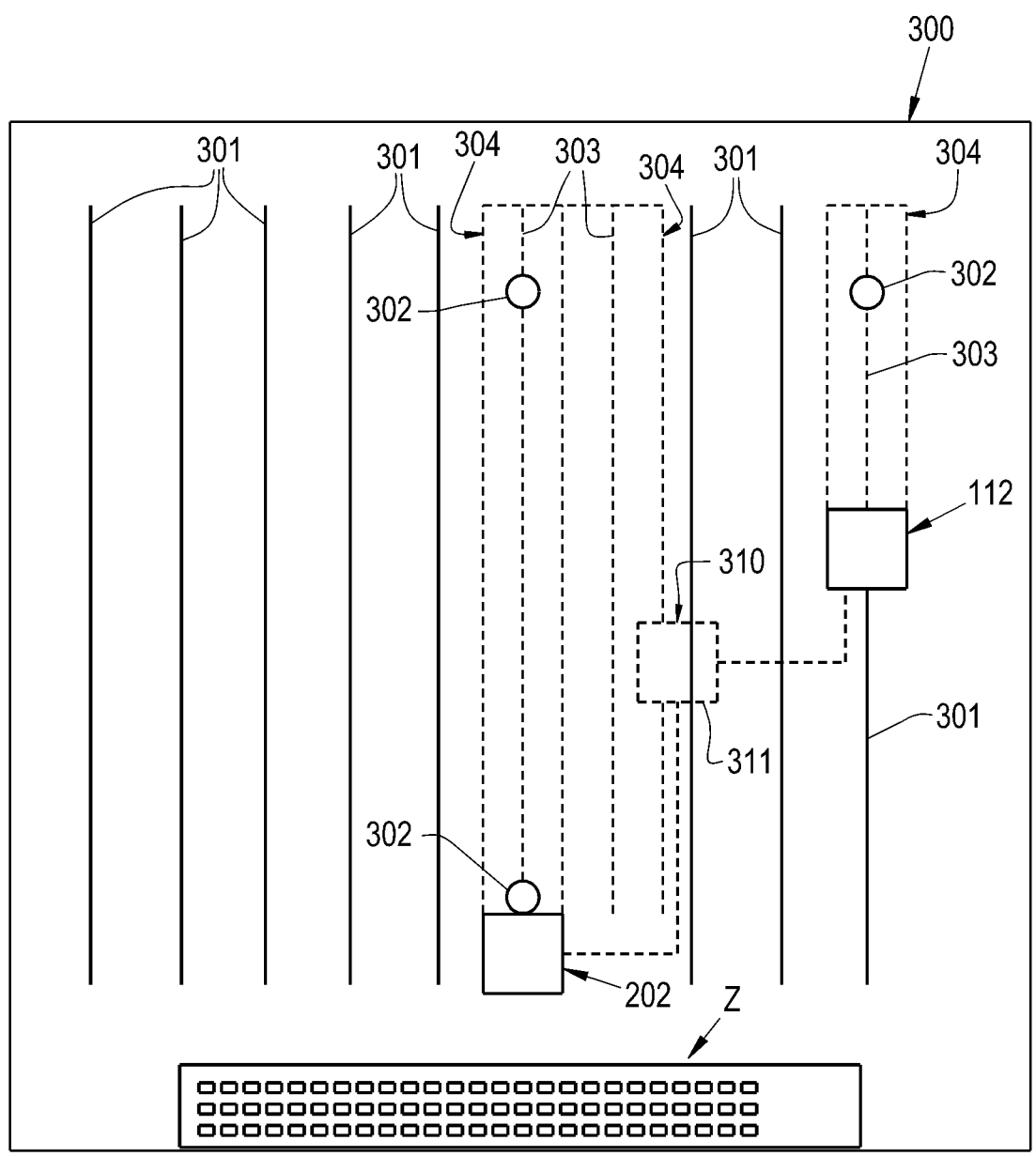
FIG. 3 illustrates a schematic view of an exemplary embodiment of a field map that may be defined by a controller of the bale retriever of FIG. 2, in accordance with the present disclosure.

In some embodiments, the controller 212 is configured to define at least one windrow, illustrated as a plurality of windrows 301 in FIG. 3, on the field map 300 that correspond to windrows in the field. The windrow(s) 301 can be defined in a variety of ways. In some embodiments, the windrow(s) 301 are defined based on swath lines that the baler 112 follows to travel through the field, with the swath lines being generally aligned with the windrows 301 so the baler 112 follows the windrows 301 to collect and pack crop material into bales 302, as illustrated. In some embodiments, the swath lines define the baler planned path of the baler 112. In some embodiments, the controller 212 is configured to define collected windrows 303, illustrated in dashed lines, on the field map 300. By defining the collected windrows 303 on the field map 300, the controller 212 can keep track of space on the field that is free of crop material, the significance of which will be defined further herein.

Figure 4:
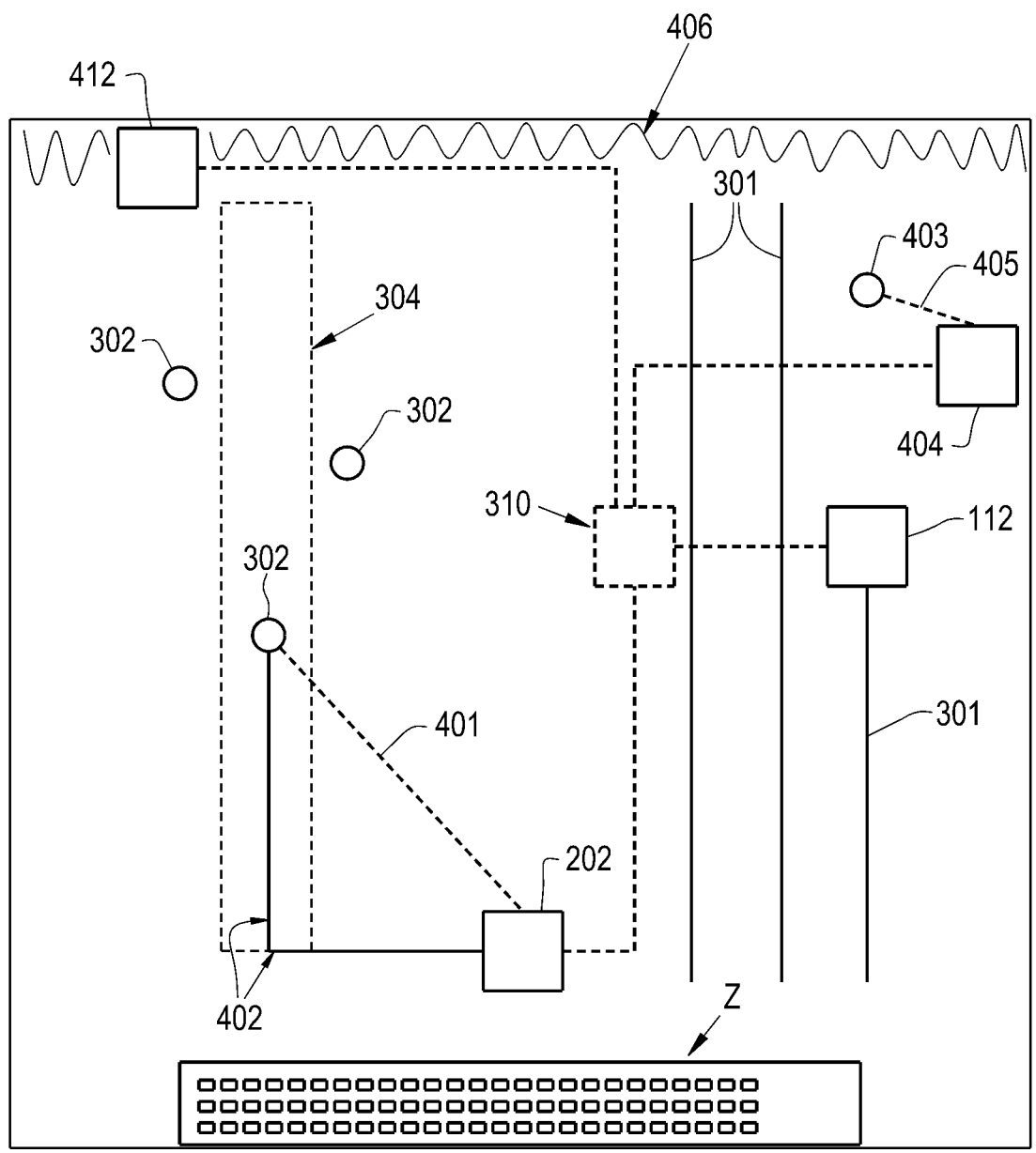
FIG. 4 illustrates the field map of FIG. 3 with both a straight-line path and a path from the bale retriever of FIG. 2 to an expected location of a bale, in accordance with the present disclosure.

Referring particularly now to FIGS. 3-4, it is illustrated how the controller 212 may define a baler traveled path 304 on the field map 300 from the received baler travel signal and switch between an efficiency mode and a compaction mode to generate a steering control signal that is a shortest distance control signal and/or a compaction avoidance control signal. The generated steering control signal is output to the steering assembly 208 to steer the bale retriever 202 toward the expected location of the bale to collect the bale. The controller 212 may be configured to switch between the efficiency mode and the compaction mode based on, for example, operator input to directly make the switch. In some embodiments, the controller 212 may be configured to automatically switch between the efficiency mode and the compaction mode based on a location within a field, e.g., switch to the efficiency mode in a portion of a field that is already heavily compacted and/or has a soil type that is less prone to compaction, and/or when the bale retriever 202 reaches certain fuel levels, e.g., switch to the compaction mode when the bale retriever 202 has a high level of fuel and/or the bale to be retrieved is in a portion of the field with soil that is prone to compaction. It should be appreciated that the foregoing ways of switching between the efficiency mode and the compaction mode are exemplary only, and other ways and/or rationales for the controller 212 switching between the modes are contemplated according to the present disclosure.

The controller 212 is configured to generate the shortest distance control signal when in the efficiency mode and to generate the compaction avoidance control signal when in the compaction mode. The shortest distance control signal corresponds to a straight-line path 401, illustrated in dashed-line in FIG. 4, from the bale retriever 202 to the expected location of the bale 302 that does not cross a windrow 301. The compaction avoidance control signal corresponds to a path 402, illustrated in solid-lines in FIG. 4, from the bale retriever 202 to the expected location of the bale 302 that overlaps the bale traveled path. As illustrated in FIG. 4, it can be seen that the straight-line path 401 represents a minimal distance that the bale retriever 202 must travel to get to the expected location of the bale 302, which minimizes the fuel consumption of the bale retriever 202 while also avoiding the bale retriever 202 driving over any windrows 301 and potentially damaging or dispersing crop material. On the other hand, the path 402 that overlaps the baler traveled path has the bale retriever 202 go over ground where the baler 112 has already traveled to reduce the risk of the bale retriever 202 compacting additional parts of the field, which can reduce yield. It should be appreciated that while the straight-line path 401 and the path 402 are illustrated as being different paths in FIG. 4, in some instances the straight-line path 401 and the path 402 will overlap. For example, if the expected locations of two bales 301 lie on a swath line and the bale retriever 202 is substantially on the swath line, the straight-line path 401 and the path 402 may overlap due to the bale retriever 202 following the swath line to the expected location of both bales 301. Further, the generated steering control signal may be generated to avoid the bale retriever 202 driving into a bale drop zone Z until the bale retriever 202 is ready to drop its collected bale(s) at the bale drop zone Z.

To generate the shortest distance control signal, the controller 212 may be configured to determine a current location of the bale retriever 202, such as a GPS-based location, and define the expected location of the bale 302 as a GPS-based location. The controller 212 may define the straight-line path 401 using trigonometric functions and/or the Pythagorean theorem and the GPS-based current location of the bale retriever 202 and the expected location of the bale 302 to define a hypotenuse, which represents the straight-line path 401 from the current location of the bale retriever 202 to the expected location of the bale 302. It should be appreciated that the controller 212 may be configured to generate the shortest distance control signal in a variety of other ways, and the previously described way is just one exemplary way.

After defining the straight-line path 401, the controller 212 also determines if the straight-line path 401 crosses a windrow 301 on the field map 300. For example, as illustrated in FIG. 4, the bale retriever 202 could not travel to a bale 403 with a straight-line path and not cross one of the windrows 301. In such a case, the controller 212 may be configured to determine when the traveled path of the baler 112 has gone over the windrows 301, indicating that the windrows 301 have been collected, before generating the shortest distance control signal corresponding to the straight-line path toward the bale 403. In some embodiments, the controller 212 is also configured to define one or more obstacle zones in the field map 300 and determine if the straight-line path 401 crosses an obstacle zone. In the given example, the windrows 301 may be considered obstacle zones. Other possible obstacle zones may include, but are not limited to, an area where there is a tree or significant mud. The obstacle zones may be defined by an operator manually; alternatively, or in addition, the obstacle zones may be defined based on a path traveled by another vehicle, such as a mower-conditioner, which presumably avoids obstacles in the field.

To generate the compaction avoidance control signal, the controller 212 may be configured to compare the expected location of the bale 302 with the baler traveled path, which may both represent areas, and determine a shortest path between the location of the bale retriever 202 and the expected location of the bale 302 that is bound within the baler traveled path and the expected location of the bale 302. Generating the compaction avoidance control signal may also take other parameters into account, such as a location of headlands 406 in the field map 300, to determine the shortest path bound within the baler traveled path. As illustrated in FIG. 4, the shortest path 402 corresponds to the bale retriever 202 traveling perpendicular and parallel to the windrows 301, similarly to the movement pattern utilized by the baler 112 as it collects and packs crop material into the bales 302.

While the previous description focuses on the interaction between one baler 112 and one bale retriever 202 of the system 200, it should be appreciated that the system 200 can include multiple balers and bale retrievers. As illustrated in FIG. 4, a second baler 412, which may be similar to the baler 112, may be simultaneously collecting and packing crop material into bales 302 on the field. Similarly, a second bale retriever 404, which may be similar to the bale retriever 202, may be simultaneously collecting and transporting the formed bales 302. The second baler 412 and the second bale retriever 404 may both be communicating with the communication network 310 using respective interfaces and functioning similarly to the baler 112 and bale retriever 202. The controller 212 of the bale retriever 202 and the controller of the second bale retriever 404 may both be configured to receive a second baler travel signal corresponding to a travel path of the second baler 412 and define a second baler traveled path on the field map 300 from the received second baler travel signal from the second baler 412.

In some embodiments, the bale retrievers 202, 404 are configured to communicate with one another so their respective controllers may determine which of the bale retrievers 202, 404 is in a better position to collect a certain bale. For example, the second bale retriever 404 may be more suited to collect the bale 403 because its straight-line path 405 to the bale 403 both is shorter than the corresponding straight-line path of the bale retriever 202 to the bale 403 and also does not cross any windrows 301 in the field. In this respect, the controller of the second bale retriever 404 may determine that it has an acceptable straight-line path to the bale 403, whereas the bale retriever 202 does not, and generate a shortest distance control signal corresponding to the straight-line path 405 from the second bale retriever 404 to the expected location of the bale 403. The controller of the second bale retriever 404 may also be configured to output a bale retrieval signal to the controller 212 of the bale retriever 202 that causes the controller 212 of the bale retriever 202 to remove the expected location of the bale 403 from the field map 300, so the controller 212 does not output a steering control signal to the steering assembly 208 to steer the bale retriever 202 toward the bale 403. Similarly, the controller 212 of the bale retriever 202 may output a bale retrieval signal to the controller of the second bale retriever 404 for bales 302, which are further from the second bale retriever 404 and cannot be reached by a straight-line path without crossing windrows 301, so the second bale retriever 404 does not steer toward the bales 302. It should thus be appreciated that the system 200 can be adapted to include a plurality of balers 112, 412 and/or bale retrievers 202, 404 to expedite production and transportation of crop material bales in a field.

Figure 5:
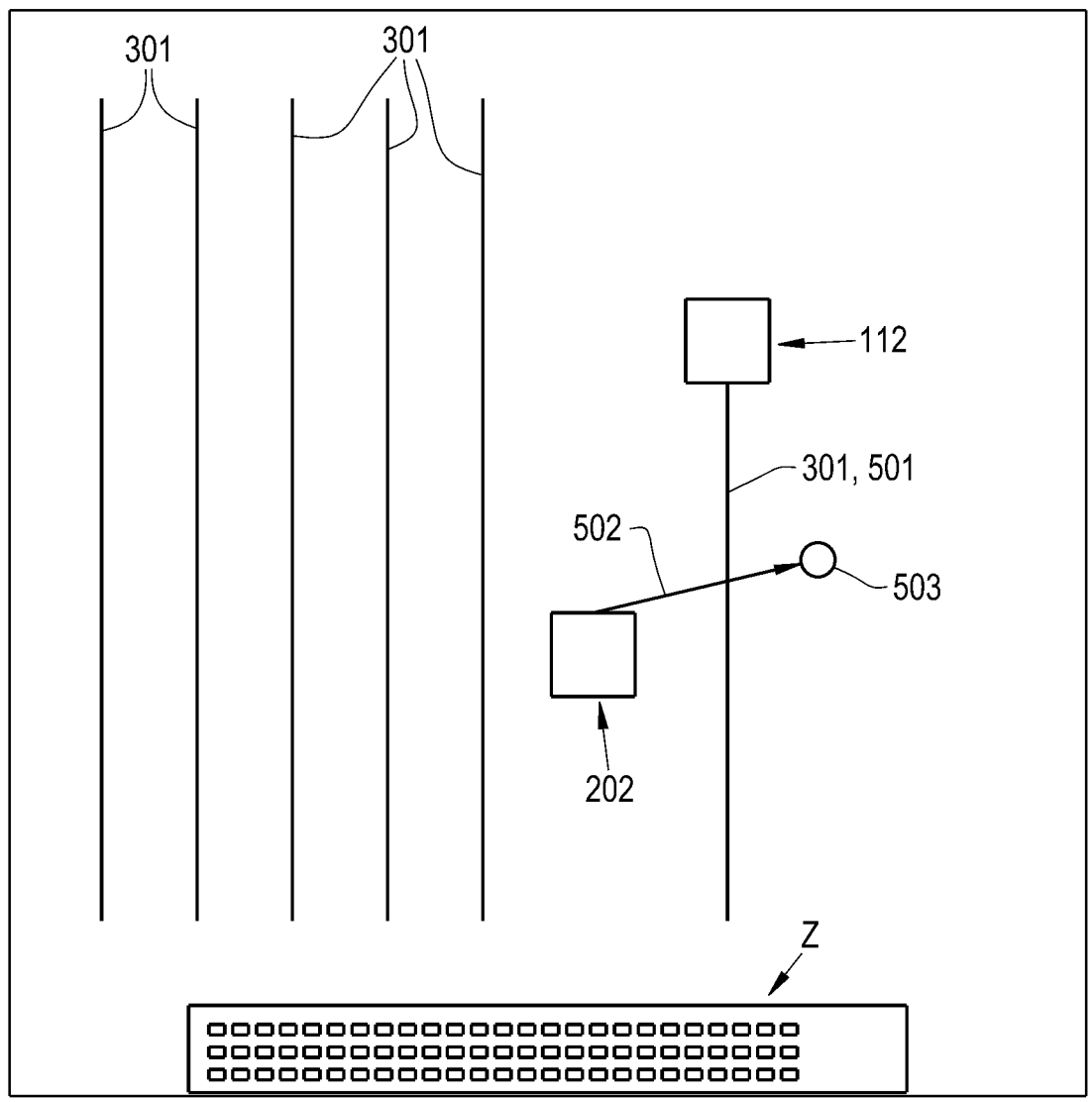
FIG. 5 illustrates the field map of FIG. 3 when the bale retriever defines an imminent travel path of the baler, in accordance with the present disclosure.

In some embodiments, and referring now to FIG. 5, the controller 212 is configured to predict an imminent travel path 501 of the baler 112 and generate the steering control signal so the bale retriever 202 does not cross the imminent travel path 501. As used herein, the "imminent travel path" of the baler 112 is the travel path of the baler 112 that is expected to occur around the same time that the bale retriever 202 would be crossing the travel path 501. As illustrated in FIG. 5, the imminent travel path 501 of the baler 112 follows one of the windrows 301 and is in a straight-line path 502 from the bale retriever 202 to a bale 503. The controller 212 may be configured to predict the imminent travel path 501 based on the baler planned path, the baler travel path, the location of the baler 112, a current heading of the baler 112, and/or a travel speed of the baler 112. Since the imminent travel path 501, and a windrow 301, are both in the straight-line path 502 from the bale retriever 202 to the bale 503, the controller 212 may be further configured to compare a first time interval that it will take for the baler 112 to clear the area of the imminent travel path 501 and collect the windrow 301, allowing the bale retriever 202 to follow the straight-line path 502 without crossing the imminent travel path 501 or the windrow 301, to a second time interval that it will take for the bale retriever 202 to follow a different path. Based on the comparison and other considerations, which may be selected by an operator, the controller 212 may decide to wait for the baler 112 to collect the windrow 301 and then signal for the bale retriever 202 to follow the straight-line path 502 and collect the bale 503. By having the controller 212 decide to wait for the baler 112 to collect the windrow 301, a significant amount of fuel, and possibly time, may be saved compared to the bale retriever 202 driving around the windrow 301 to collect the bale 503.

Figure 6:
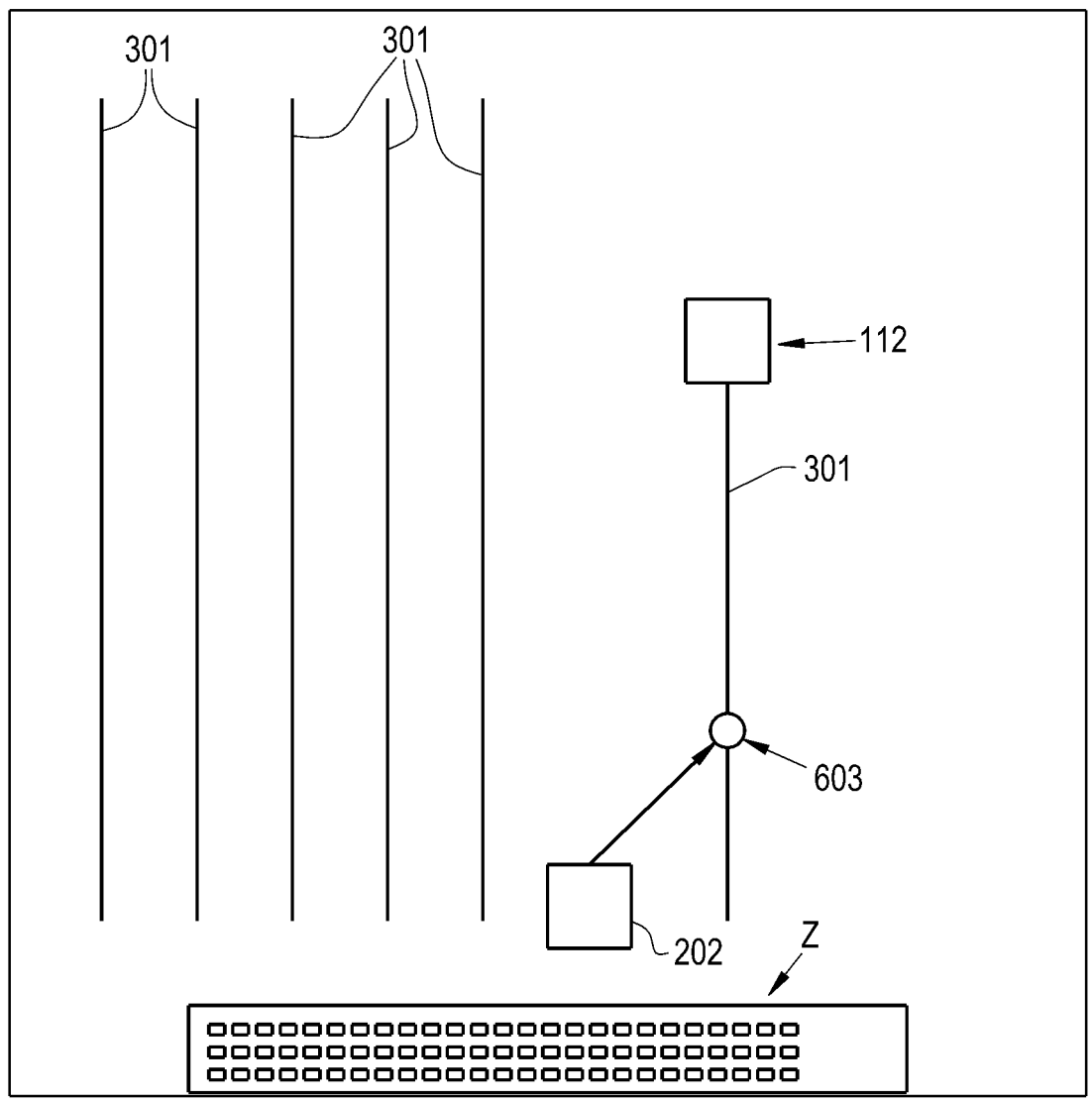
FIG. 6 illustrates the field map of FIG. 3 when the bale retriever defines the expected location of a bale based on a baler travel path and at least one operating parameter of the baler.

In some embodiments, and referring now to FIG. 6, the controller 131 of the baler 112 is configured to output an estimated bale drop location signal corresponding to an estimated bale drop location of a bale 603, which is received by the controller 212 of the bale retriever 202. The controller 212 may use the estimated bale drop location to define an expected location of the bale 603 and generate an appropriate steering control signal to direct the bale retriever 202 toward the bale 603. As illustrated in FIG. 6, the bale retriever 202 may then steer and travel toward the bale 603 while staying outside an area encompassed by an imminent travel path of the baler 112 and the windrow 301. After the baler 112 passes, and drops the bale 603 in the expected location, the bale retriever 202 may travel to the bale 603 and collect the bale 603. By heading toward the expected location of the bale 603 based on the estimated bale drop location from the baler 112, the bale retriever 202 does not need to follow the baler 112 around the field and can, for example, collect bales ejected by other balers and/or collect other bales previously ejected by the baler 112.

From the foregoing, it should be appreciated that the system 200 including the bale retriever 202, 404 provided according to the present disclosure allows intelligent, automatic control of a bale retriever in a field. The bale retriever 202, 404 can operate based on expected locations of one or more bales in the field, allowing the bale retriever(s) 202, 404 to operate simultaneously with one or more balers 112,412. The bale retriever 202, 404 can be in real-time communication with one or more balers 112, 412 operating in a same general area to coordinate movement of the bale retriever(s) 202, 404 and the baler(s) 112, 412 so bales are produced and transported at roughly the same time. By having the bale retriever 202, 404 able to switch between the efficiency mode and the compaction mode, the bale retriever 202, 404 can follows paths that maximize fuel efficiency and/or follow paths that minimize ground compaction. Thus, the system 200 provided according to the present invention can produce and transport crop materials bales in a manner that can maximize fuel efficiency and/or minimize ground compaction while also reducing the time that the bales sit in the field adjacent to where the baler ejects them.

Figure 7:
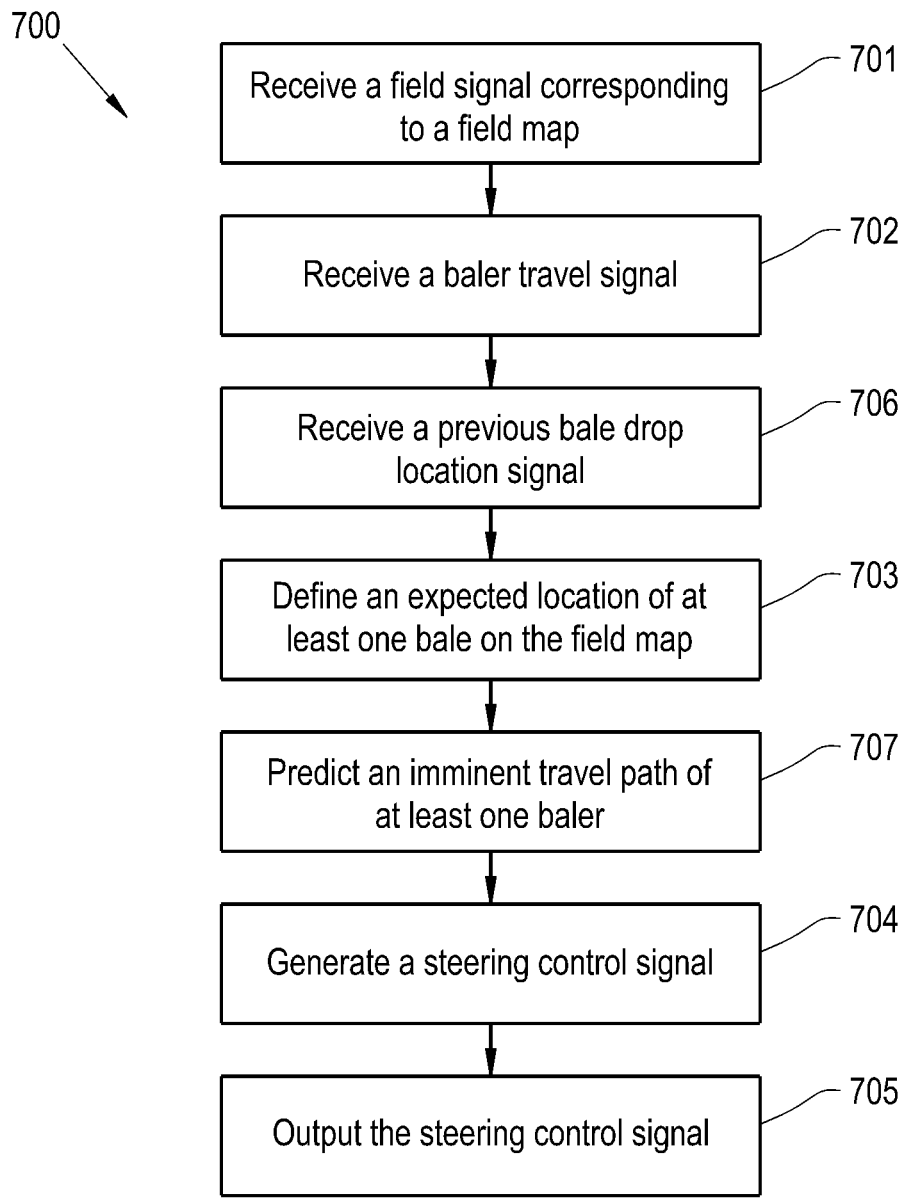
FIG. 7 illustrates a flow chart of an exemplary embodiment of a method for controlling a bale retriever, provided in accordance with the present disclosure.

Referring now to FIG. 7, an exemplary embodiment of a method 700 of controlling a bale retriever including a controller, such as the bale retriever 202 and/or the second bale retriever 404, to retrieve bales in a field is illustrated. The method 700 is performed by the controller 212 and includes receiving 701 a field signal corresponding to a field map 300; receiving 702 a baler travel signal corresponding to at least one of a baler planned path or a baler travel path of at least one baler; defining 703 an expected location of at least one bale 302, 403 on the field map 300 based at least partially on the baler travel signal; generating 704 a steering control signal based at least partially on the expected location of the at least one bale 302, 403; and outputting 705 the steering control signal to a steering assembly 208 of the bale retriever 202 so the bale retriever 202 is steered towards the expected location of the bale(s) 302, 403. The expected location of the bale(s) 302, 403 may be defined 703 in a variety of ways, as previously described. The method 700 may include, for example, receiving 706 a previous bale drop location signal corresponding to a location of a previously dropped bale, with defining 703 the expected location of the bale(s) being based at least partially on the received previous bale drop location signal. The method 700 may also include predicting 707 an imminent travel path 501 of the baler(s) 112, 412, with the steering control signal being generated 704 so the bale retriever 202, 402 does not cross the imminent travel path 501. It should be appreciated that the method 700 may also include any one or more of the previously described functions of the controller 212.

Figure 8:
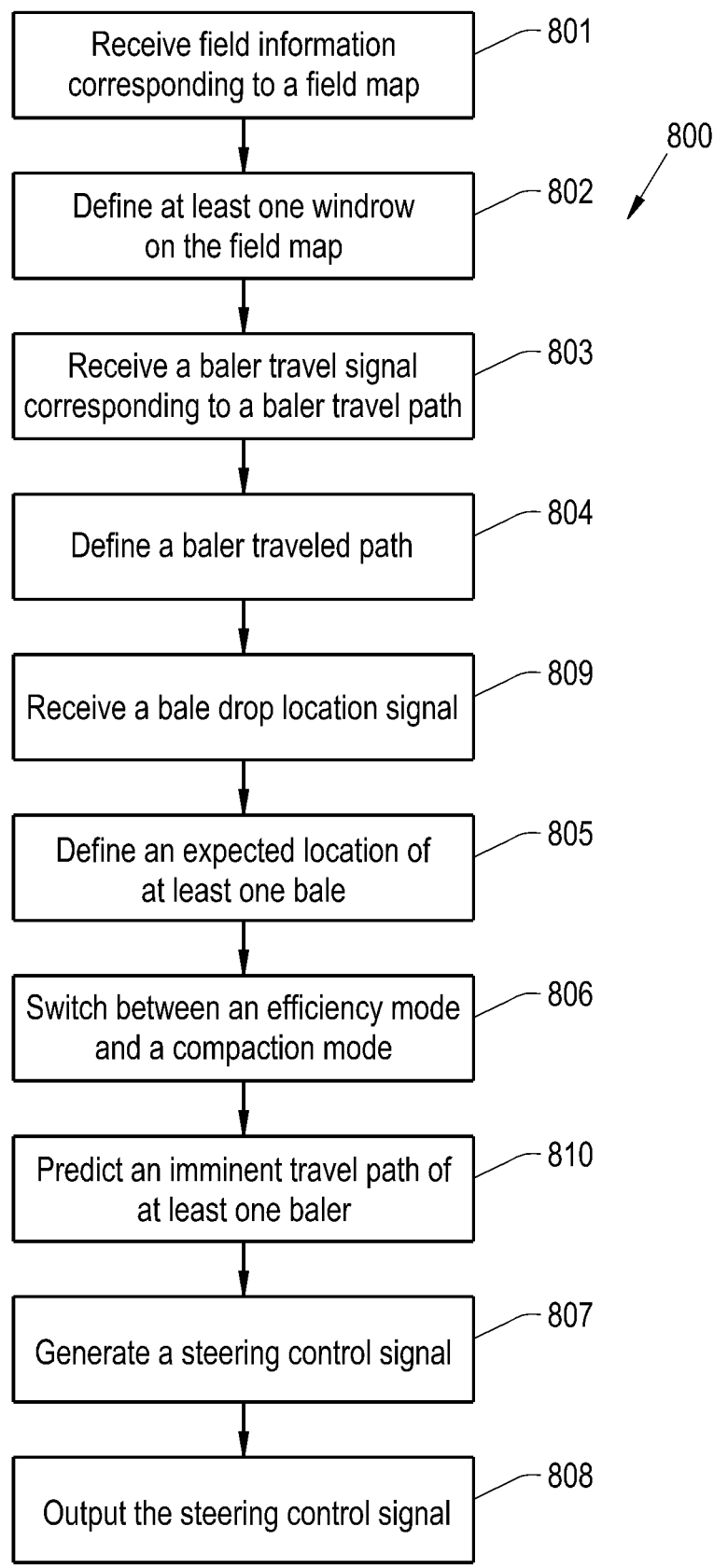
FIG. 8 illustrates a flow chart of another exemplary embodiment of a method for controlling a bale retriever, provided in accordance with the present disclosure.

Referring now to FIG. 8, another exemplary embodiment of a method 800 of controlling a bale retriever including a controller, such as the bale retriever 202 and/or the second bale retriever 404, to retrieve bales in a field is illustrated. The method 800 is performed by the controller 212 and includes receiving 801 a field signal corresponding to a field map 300; defining 802 at least one windrow 301 on the field map 300; receiving 803 a baler travel signal corresponding to a baler travel path of at least one baler, such as the baler 112 and/or the second baler 412; defining 804 a baler traveled path 304 on the field map 300 from the received baler travel signal; defining 805 an expected location of at least one bale 302, 403 on the field map 300; switching 806 between an efficiency mode and a compaction mode; generating 807 a steering control signal that is at least one of a shortest distance control signal or a compaction avoidance control signal; and outputting 808 the steering control signal to a steering assembly 208 of the bale retriever 202, 404 so the bale retriever 202, 404 is steered toward the expected location of the at least one bale 302, 403. The controller 212 is configured to generate 807 the shortest distance control signal when in the efficiency mode and the compaction avoidance control signal when in the compaction mode. The shortest distance control signal corresponds to a straight-line path 401, 405 from the bale retriever 202, 404 to the expected location of the at least one bale that does not cross the windrow(s) 301 and the compaction avoidance control signal corresponds to a path 402 from the bale retriever 202 to the expected location of the at the least one bale 302 that overlaps the baler traveled path 304. In some embodiments, the method 800 further includes receiving 809 a bale drop location signal, which may be from the baler(s) 212, 412 and/or the communication network 310, and the defined expected location of the at least one bale 302, 403 is based at least partially on the received bale drop location signal. In some embodiments, the method 800 further includes predicting 810 an imminent travel path 501 of the at least one baler 212, 412 and the steering control signal is generated 807 so the bale retriever 202, 404 does not cross the imminent travel path 501 when the bale retriever 202, 404 moves toward the expected location of the bale(s) 302, 403. The method 800 may also include any of the previously described functions of the controller 212, with further description being omitted for brevity.

It is to be understood that the steps of the method 700, 800 are performed by the controller 212 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the controller 212 described herein, such as the method 700, 800, is implemented in software code or instructions which are tangibly stored on a tangible computer readable medium. The controller 212 loads the software code or instructions via a direct interface with the computer readable medium or via a wired and/or wireless network. Upon loading and executing such software code or instructions by the controller 212, the controller 212 may perform any of the functionality of the controller 212 described herein, including any steps of the method 700, 800 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

The invention claimed is:

1. A bale retriever, comprising:
a chassis;
a steering assembly carried by the chassis and configured to steer the bale retriever;
a bale pick up carried by the chassis; and
a controller operatively coupled to the steering assembly, the controller being configured to:
receive a field signal corresponding to a field map;
receive a baler travel signal corresponding to at least one of a baler planned path or a baler travel path of at least one baler;
define an expected location of at least one bale on the field map based at least partially on the baler travel signal;
define at least one windrow on the field map;
define a baler traveled path on the field map from the received baler travel signal;
generate a steering control signal, which is based at least partially on the expected location of the at least one bale, as a shortest distance control signal when in an efficiency mode and as a compaction avoidance control signal when in a compaction mode, wherein the shortest distance control signal corresponds to a straight-line path from the bale retriever to the expected location of the at least one bale that does not cross the at least one windrow and the compaction avoidance control signal corresponds to a path from the bale retriever to the expected location of the at least one bale that overlaps the baler traveled path; and
output the steering control signal to the steering assembly.

2. The bale retriever of claim 1, wherein the controller is further configured to receive a previous bale drop location signal corresponding to a location of a previously dropped bale and define the expected location of the at least one bale based at least partially on the received previous bale drop location signal.

3. The bale retriever of claim 1, wherein the controller is configured to define the expected bale location based at least partially on the baler planned path and at least one operating parameter of the at least one baler.

4. The bale retriever of claim 3, wherein the at least one operating parameter comprises at least one of a defined bale size or a travel speed of the at least one baler.

5. The bale retriever of claim 1, further comprising a communication interface configured to communicate with at least one of the at least one baler or a communication network.

6. The bale retriever of claim 5, wherein the controller is configured to receive real-time signals corresponding to at least one of the baler planned path or the baler travel path via the communication interface.

7. The bale retriever of claim 1, wherein the controller is further configured to predict an imminent travel path of the at least one baler and generate the steering control signal so the bale retriever does not cross the imminent travel path.

8. A system for producing and transporting crop material bales, the system comprising:
at least one baler comprising:
a crop collector configured to collect crop material from a field; and
a bale chamber configured to bale crop material collected by the crop collector; and
at least one bale retriever comprising:
a chassis;
a steering assembly carried by the chassis and configured to steer the bale retriever;
a bale pick up carried by the chassis; and
a controller operatively coupled to the steering assembly, the controller being configured to:
receive a field signal corresponding to a field map;
receive a baler travel signal corresponding to at least one of a baler planned path or a baler travel path of at least one baler;
define an expected location of at least one bale on the field map based at least partially on the baler travel signal;
define at least one windrow on the field map;
define a baler traveled path on the field map from the received baler travel signal;
generate a steering control signal, which is based at least partially on the expected location of the at least one bale, as a shortest distance control signal when in an efficiency mode and as a compaction avoidance control signal when in a compaction mode, wherein the shortest distance control signal corresponds to a straight-line path from the bale retriever to the expected location of the at least one bale that does not cross the at least one windrow and the compaction avoidance control signal corresponds to a path from the bale retriever to the expected location of the at least one bale that overlaps the baler traveled path; and
output the steering control signal to the steering assembly.

9. The system of claim 8, wherein the controller is further configured to receive a previous bale drop location signal corresponding to a location of a previously dropped bale and define the expected location of the at least one bale based at least partially on the received previous bale drop location signal.

10. The system of claim 8, wherein the controller is configured to define the expected bale location based at least partially on the baler planned path and at least one operating parameter of the at least one baler.

11. The system of claim 10, wherein the at least one operating parameter comprises at least one of a defined bale size or a travel speed of the at least one baler.

12. The system of claim 8, wherein the at least one bale retriever further comprises a communication interface configured to communicate with at least one of the at least one baler or a communication network.

13. The system of claim 12, wherein the at least one baler further comprises a baler communication interface configured to communicate with at least one of the at least one bale retriever or the communication network.

14. The system of claim 13, wherein the baler communication interface is configured to output a parameter signal corresponding to at least one operating parameter of the at least one baler, the at least one operating parameter comprising at least one of a current location, a travel speed, or a current heading of the at least one baler.

15. The system of claim 14, wherein the baler communication interface is configured to output real-time signals corresponding to at least one of the baler travel path, the baler planned path, the current location, the travel speed, or the current heading of the at least one baler and the controller of the bale retriever is configured to receive the real-time signals.

16. The system of claim 8, wherein the controller is further configured to predict an imminent travel path of the at least one baler and generate the steering control signal so the bale retriever does not cross the imminent travel path.

17. The system of claim 8, wherein at least one of:
the at least one baler comprises a plurality of balers; or
the at least one bale retriever comprises a plurality of bale retrievers.

18. A method of controlling a bale retriever comprising a controller to retrieve bales in a field, the method being performed by the controller and comprising:
receiving a field signal corresponding to a field map;
receiving a baler travel signal corresponding to at least one of a baler planned path or a baler travel path of at least one baler;
defining an expected location of at least one bale on the field map based at least partially on the baler travel signal;
define at least one windrow on the field map;
define a baler traveled path on the field map from the received baler travel signal;
generating a steering control signal, which is based at least partially on the expected location of the at least one bale, as a shortest distance control signal when in an efficiency mode and as a compaction avoidance control signal when in a compaction mode, wherein the shortest distance control signal corresponds to a straight-line path from the bale retriever to the expected location of the at least one bale that does not cross the at least one windrow and the compaction avoidance control signal corresponds to a path from the bale retriever to the expected location of the at least one bale that overlaps the baler traveled path; and
outputting the steering control signal to a steering assembly of the bale retriever so the bale retriever is steered towards the expected location of the at least one bale.

* * * * *